(12) United States Patent
Cao

(10) Patent No.: US 11,609,459 B2
(45) Date of Patent: Mar. 21, 2023

(54) LIQUID CRYSTAL DISPLAY PANEL

(71) Applicant: TCL CHINA STAR OPTOELECTRONICS TECHNOLOGY CO., LTD., Guangdong (CN)

(72) Inventor: Zhibo Cao, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/648,362

(22) PCT Filed: Feb. 28, 2020

(86) PCT No.: PCT/CN2020/077280
§ 371 (c)(1),
(2) Date: Sep. 12, 2022

(87) PCT Pub. No.: WO2021/147138
PCT Pub. Date: Jul. 29, 2021

(65) Prior Publication Data
US 2022/0413343 A1    Dec. 29, 2022

(30) Foreign Application Priority Data
Jan. 20, 2020 (CN) .......................... 202010066877.6

(51) Int. Cl.
G02F 1/1343 (2006.01)
G02F 1/1337 (2006.01)

(52) U.S. Cl.
CPC ...... *G02F 1/134309* (2013.01); *G02F 1/1337* (2013.01)

(58) Field of Classification Search
CPC ............. G02F 1/134309; G02F 1/1337; G02F 1/1339; G02F 1/0107; G02F 1/13396;
(Continued)

(56) References Cited

U.S. PATENT DOCUMENTS

2007/0177074 A1*  8/2007  Jang .................... G02F 1/13394
349/110
2008/0252835 A1  10/2008  Motomatsu et al.
(Continued)

FOREIGN PATENT DOCUMENTS

CN         1582411 A      2/2005
CN       101285968 A     10/2008
(Continued)

*Primary Examiner* — Mariam Qureshi
(74) *Attorney, Agent, or Firm* — PV IP PC; Wei Te Chung; Ude Lu

(57) ABSTRACT

A liquid crystal display panel is provided. The liquid crystal display panel includes a first substrate disposed opposite to a second substrate. A color resist layer is disposed between the first substrate and the second substrate. A conductive electrode is disposed on the color resist layer. A via hole penetrating the conductive electrode and in contact with the color resist layer is formed on the conductive electrode. A support column is disposed at a position corresponding to the via hole, and a material for preparing the support column includes a molecular sieve.

20 Claims, 3 Drawing Sheets

(58) Field of Classification Search
CPC ........ H01J 9/242; H01J 11/36; H01J 2211/36; H01J 2217/49271
See application file for complete search history.

(56) References Cited

U.S. PATENT DOCUMENTS

| | | |
|---|---|---|
| 2011/0076418 A1 | 3/2011 | Motomatsu et al. |
| 2014/0253850 A1* | 9/2014 | Lee .................. G02F 1/133512 |
| | | 349/106 |
| 2019/0115212 A1 | 4/2019 | Nadal et al. |
| 2021/0381303 A1* | 12/2021 | Neander ............... E06B 3/6722 |

FOREIGN PATENT DOCUMENTS

| | | |
|---|---|---|
| CN | 102540586 A | 7/2012 |
| CN | 206020889 U | 3/2017 |
| CN | 108490701 A | 9/2018 |
| CN | 108663853 A | 10/2018 |
| CN | 111176022 A | 5/2020 |
| JP | H02186322 A | 7/1990 |
| JP | H05188358 A | 7/1993 |
| JP | 2002350870 A | 12/2002 |
| JP | 2008040135 A | 2/2008 |
| KR | 20140091396 A | 7/2014 |

* cited by examiner

LIQUID CRYSTAL DISPLAY PANEL

FIELD

The present invention relates to the field of display technology, and more particularly, to a liquid crystal display panel.

BACKGROUND

Liquid crystal displays (LCD) have characteristics of low cost, high resolution, high contrast, and fast response times, and are one of important displays on the market. The liquid crystal displays mainly consist of an array substrate, a color filter substrate, and a liquid crystal layer disposed between the array substrate and the color filter substrate. In order to facilitate alignment of the liquid crystal, a polyimide (PI) layer is coated on a surface of the array substrate and the color filter substrate. The PI material is dripped and diffused to be evenly coated on the array substrate and the color filter substrate.

However, during diffusion of the PI solution, the PI solution diffuses to via holes on the array substrate or the color filter substrate that are in contact with the color resist layer. The PI solution flowing into the via holes is incomplete due to high viscosity of the PI solution, so that the PI layer formed in the via hole is thin or the PI layer cannot be formed, and the internal ions of the color resist layer enter the liquid crystal layer, which causes the voltage of the liquid crystal at the via hole to change. Thus, uneven display brightness at the via hole happens.

SUMMARY OF INVENTION

Technical Issues

A liquid crystal display panel is provided to solve the technical problem that the PI solution flowing into the via holes is incomplete due to high viscosity of the PI solution, and the ions inside the color resist layer enter the liquid crystal layer, which causes the voltage of the liquid crystal at the via hole to change, and uneven display brightness at the via hole is happened.

Solution of Problem

Technical Solution

A liquid crystal display panel comprises:
a first substrate;
a second substrate disposed opposite to the first substrate;
a liquid crystal layer disposed between the first substrate and the second substrate;
a color resist layer disposed between the first substrate and the second substrate;
a conductive electrode disposed on the color resist layer; and
an alignment layer disposed on the conductive electrode. The conductive electrode is provided with a via hole penetrating through the conductive electrode and in contact with the color resist layer, and a support column is disposed on a side of the conductive electrode away from the color resist layer and corresponding to the via hole, and a material of the support column comprises a molecular sieve, and the molecular sieve comprises hydrated aluminosilicate.

In one embodiment, the color resist layer is disposed between the first substrate and the conductive electrode, or the color resist layer is disposed between the second substrate and the conductive electrode.

In one embodiment, a pixel electrode and a first alignment layer are sequentially disposed on the first substrate, and a common electrode and a second alignment layer are sequentially disposed on the second substrate.

In one embodiment, the color resist layer is disposed between the first substrate and the pixel electrode, the conductive electrode comprises a pixel electrode disposed on the color resist layer, the alignment layer comprises the first alignment layer disposed on the pixel electrode, and the via hole penetrates through the pixel electrode.

In one embodiment, the via hole penetrates through the color resist layer.

In one embodiment, the color resist layer is disposed between the second substrate and the common electrode, the conductive electrode comprises the common electrode disposed on an array layer, the alignment layer comprises the second alignment layer disposed on the common electrode, and the via hole penetrates through the common electrode.

In one embodiment, the support column is disposed on the second alignment layer.

In one embodiment, a plurality of the via holes are provided, and the support column comprises a plurality of columns corresponding to the plurality of via holes one by one.

In one embodiment, the support column comprises a primary support column and a secondary support column, the primary support column contacts with the first alignment layer and the second alignment layer, and the secondary column is spaced from the second alignment layer.

In one embodiment, a mass fraction of the molecular sieve in the support column ranges from 5% to 20%.

A liquid crystal display panel comprises:
a first substrate;
a second substrate disposed opposite to the first substrate;
a liquid crystal layer disposed between the first substrate and the second substrate;
a color resist layer disposed between the first substrate and the second substrate;
a conductive electrode disposed on the color resist layer; and
an alignment layer disposed on the conductive electrode. The conductive electrode is provided with a via hole penetrating through the conductive electrode and in contact with the color resist layer, and
a support column is disposed on a side of the conductive electrode away from the color resist layer and corresponding to the via hole, and a material of the support column comprises a molecular sieve.

In one embodiment, the color resist layer is disposed between the first substrate and the conductive electrode, or the color resist layer is disposed between the second substrate and the conductive electrode.

In one embodiment, a pixel electrode and a first alignment layer are sequentially disposed on the first substrate, and a common electrode and a second alignment layer are sequentially disposed on the second substrate.

In one embodiment, the color resist layer is disposed between the first substrate and the pixel electrode, the conductive electrode comprises a pixel electrode disposed on the color resist layer, the alignment layer comprises the first alignment layer disposed on the pixel electrode, and the via hole penetrates through the pixel electrode.

In one embodiment, the via hole penetrates through the color resist layer.

In one embodiment, the color resist layer is disposed between the second substrate and the common electrode, the conductive electrode comprises the common electrode disposed on an array layer, the alignment layer comprises the second alignment layer disposed on the common electrode, and the via hole penetrates through the common electrode.

In one embodiment, the support column is disposed on the second alignment layer.

In one embodiment, a plurality of the via holes are provided, and the support column comprises a plurality of columns corresponding to the plurality of via holes one by one.

In one embodiment, the support column comprises a primary support column and a secondary support column, the primary support column contacts with the first alignment layer and the second alignment layer, and the secondary support column is spaced from the second alignment layer.

In one embodiment, a mass fraction of the molecular sieve in the support column ranges from 5% to 20%.

A molecular sieve is added to the material for preparing the support column, and the support column is formed at a position corresponding to the via hole. When the alignment layer is formed on the conductive electrode, the PI solution flowing into the via hole is incomplete, which results that the internal ions of the color resist layer enter the liquid crystal layer. At this time, the function of adsorbing ions by the molecular sieve may effectively adsorb the ions precipitated in the color resist layer inside the molecular sieve, thereby eliminating the influence of the ions on the liquid crystal in the liquid crystal layer. Therefore, the variation of the voltage of the liquid crystal at the via hole to cause uneven display brightness at the via hole is avoided, so that twill weave is also improved.

Figure 1:
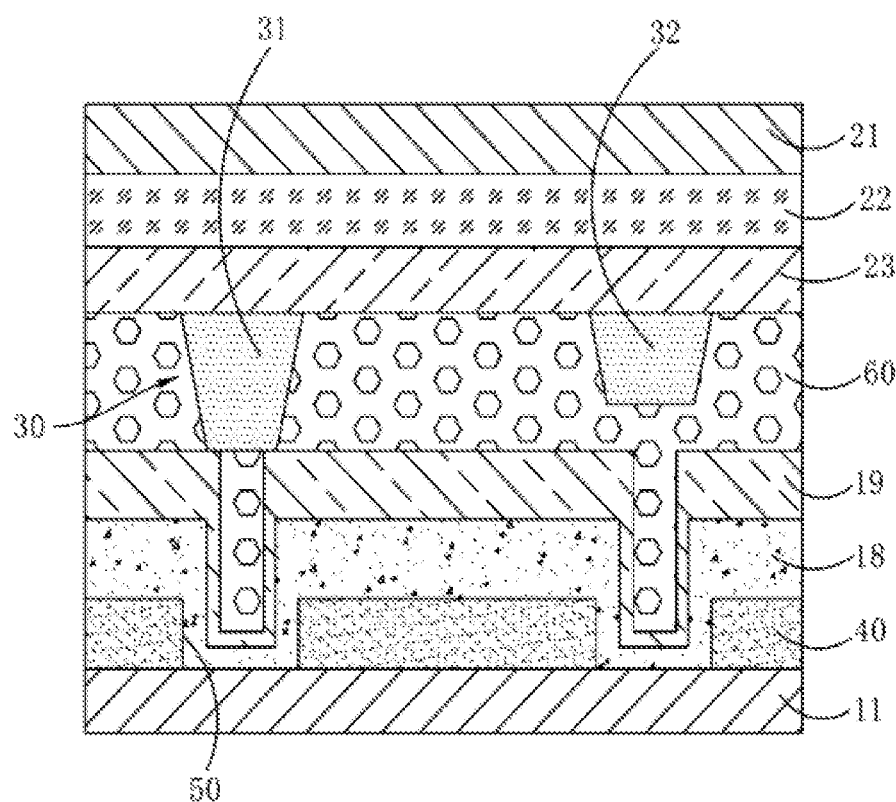
FIG. 1 is a schematic structural view of a liquid crystal display panel according to first embodiment of the present invention.

REFERENCE NUMERALS first substrate 11; active layer 12; first insulating layer 13; gate 14; second insulating layer 15; source/drain metal layer 16; organic layer 17; pixel electrode 18; first alignment layer 19; second substrate 21; common electrode 22; second alignment layer 23; black matrix 24; support column 30; primary support column 31; secondary support column 32; color resist layer 40; via hole 50; and liquid crystal layer 60.

DETAILED DESCRIPTION OF PREFERRED EMBODIMENTS

In order to make the purpose, technical solution, and effect of the present invention clear and definite, the present invention is further described in detail below with reference to the accompanying drawings and examples. It should be understood that the specific embodiments described herein are only used to explain the present invention, and are not used to limit the present invention.

During diffusion of a PI solution, the PI solution diffuses to via holes on the array substrate or the color filter substrate that are in contact with a color resist layer. The PI solution flowing into the via holes is incomplete due to high viscosity of the PI solution, so that the PI layer formed in the via hole is thin or the PI layer cannot be formed, and the internal ions of the color resist layer enter the liquid crystal layer, which causes the voltage of the liquid crystal at the via hole to change. Thus, uneven display brightness at the via hole happens. The present invention may solve the above-mentioned problem.

Referring to FIG. 1, a liquid crystal display panel includes a first substrate 11 and a second substrate 21 opposite to each other. A liquid crystal layer 60 and a color resist layer 40 are disposed between the first substrate 11 and the second substrate 21. A conductive electrode is disposed on the color resist layer 40, and an alignment layer is disposed on the conductive electrode.

The conductive electrode is provided with a via hole 50 penetrating through the conductive electrode and in contact with the color resist layer 40, and a support column 30 is disposed on a side of the conductive electrode away from the color resist layer 40 and corresponding to the via hole 50, and a material of the support column 30 comprises a molecular sieve, It should be noted that the molecular sieve is a synthetic compound with the function of screening molecules. Molecular sieves have many uniform pores and neatly arranged cavities. Molecular sieves with different pore sizes may separate molecules based on different sizes and shapes. Molecular sieves have adsorption, ion exchange, and catalytic properties.

It should be noted that material for preparing the alignment film includes, but is not limited to, polyimide (PI). A molecular sieve is added to the material for preparing the support column 30, and the support column 30 is formed at a position corresponding to the via hole 50. When the alignment layer is formed on the conductive electrode, the PI solution flowing into the via hole 50 is incomplete, which results that the internal ions of the color resist layer 40 enter the liquid crystal layer 60. At this time, the function of adsorbing ions by the molecular sieve may effectively adsorb the ions precipitated in the color resist layer 40 inside the molecular sieve, thereby eliminating the influence of the ions on the liquid crystal in the liquid crystal layer 60. Therefore, the variation of the voltage of the liquid crystal at the via hole 50 to cause uneven display brightness at the via hole 50 is avoided, so that twill weave is also improved.

Specifically, the color resist layer 40 is disposed between the first substrate 11 and the conductive electrode, and the color resist layer may also be disposed between the second substrate 21 and the conductive electrode.

Specifically, a pixel electrode 18 and a first alignment layer 19 are sequentially disposed on the first substrate 11, and a common electrode 22 and a second alignment layer 23 are sequentially disposed on the second substrate 21. The support column 30 is disposed on the second alignment layer 23.

A plurality of the via holes 50 are provided, and the support column 30 comprises a plurality of columns corresponding to the plurality of via holes 50 one by one.

It should be noted that each column comprises a molecular sieve, so that it may absorb ions and avoid the ions precipitated from the via holes 50 diffusing in the liquid crystal layer 60.

Furthermore, the support column 30 comprises a primary support column 31 and a secondary support column 32, and the primary support column 31 contacts with the first alignment layer 19 and the second alignment layer 23. Therefore, a sufficient space between the first alignment layer 19 and the second alignment layer 23 for accommodating the liquid crystal layer 60 is maintained.

The secondary support column 32 is spaced from the second alignment layer 23.

It should be noted that there is an electric field between the pixel electrode 18 and the common electrode 22, and ions generally diffuse to the first substrate 11 or the second substrate 21 under the action of the electric field, so the columns corresponding to the via holes 50 may absorb ions well.

Referring to FIG. 1, the color resist layer 40 is disposed between the first substrate 11 and the pixel electrode 18, the conductive electrode comprises a pixel electrode 18 disposed on the color resist layer 40, the alignment layer comprises a first alignment layer 19 disposed on the pixel electrode 18, and the via hole 50 penetrates through the pixel electrode 18.

Figure 2:
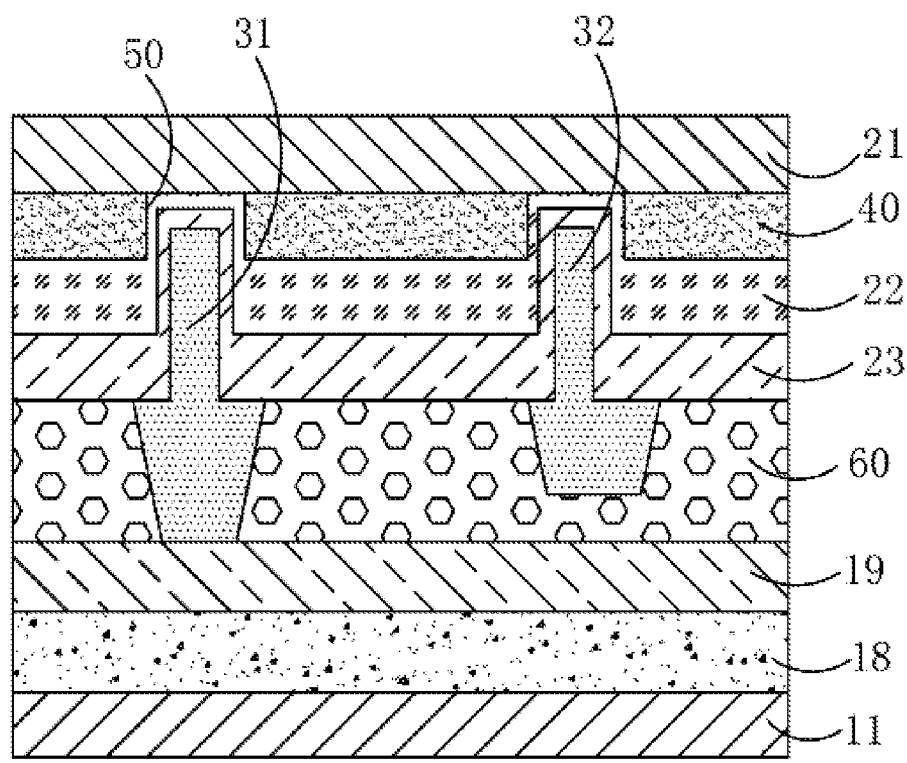
FIG. 2 is a schematic structural view of the liquid crystal display panel according to second embodiment of the present invention.

Referring to FIG. 2, when the color resist layer 40 is disposed on the second substrate 21, the color resist layer 40 is disposed between the second substrate 21 and the common electrode 22. The conductive electrode comprises a common electrode 22 disposed on an array layer, the alignment layer comprises the second alignment layer 23 disposed on the common electrode 22, and the via hole 50 is formed on the common electrode 22 and penetrates through the common electrode 22.

Specifically, material for preparing the molecular sieve may be hydrated aluminosilicate. The hydrated aluminosilicate is formed by the reaction of silicon dioxide ($SiO_2$) and aluminium oxide ($Al_2O_3$). The molecular ratio of $SiO_2$ and $Al_2O_3$ in the hydrated aluminosilicate may be adjusted to prepare molecular sieves with different pore sizes, so as to adsorb ions precipitated in the color resist layer, while avoiding the liquid crystal molecules absorbed by the molecular sieve.

It should be noted that, when the support column 30 is formed, a molecular sieve adsorbs ions and the molecular sieve and organic materials may be mixed and fixed on the second alignment layer 23 to form a support column 30. A mass fraction of the molecular sieve in the support column ranges from 5% to 20%. Also, a mass fraction of the molecular sieve in the support column is 10%.

Figure 3:
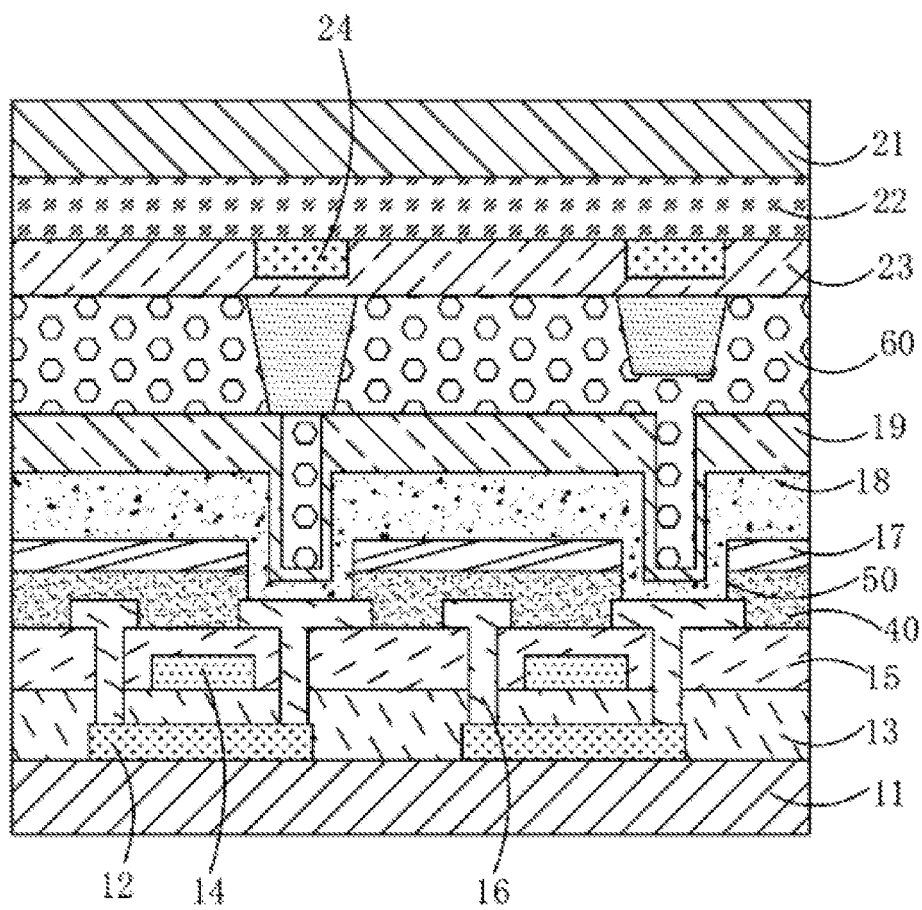
FIG. 3 is a schematic structural view of the liquid crystal display panel according to third embodiment of the present invention.

Referring to FIG. 3, in one embodiment, an array layer is further disposed on the first substrate 11. The array layer includes an active layer 12 disposed on the first substrate 11 and a first insulating layer 13 covering the active layer 12, a gate 14 disposed on the first insulating layer 13, a second insulating layer 15 covering the gate 14, and a source/drain metal layer 16 disposed on the second insulating layer 15.

Specifically, when the color resist layer 40 is disposed between the first substrate 11 and the pixel electrode 18, the color resist layer 40 is disposed on the array layer.

The via hole 50 penetrates through the color resist layer 40. In addition, the via hole 50 extends to the surface of the source/drain metal layer 16, and the pixel electrode 18 contacts the source/drain metal layer 16 through the via hole.

In one embodiment, an organic layer 17 is further disposed between the color resist layer 40 and the pixel electrode 18, and the via hole 50 penetrates the organic layer 17. The organic layer 17 is used to change the flatness of surface of the color resist layer 40, so as to prevent electric fields from interfering with each other. Therefore, it may effectively improve uneven display brightness of the liquid crystal display device due to flatness factors, and it may also reduce parasitic capacitance and display abnormalities such as flicker caused by excessive electrical load. Accordingly, the quality of the display device is improved.

In one embodiment, the color resist layer 40 includes a plurality of color resist blocks arranged at intervals. A black matrix 24 is further disposed on the common electrode 22, and the position of the black matrix 24 corresponds to a gap between two adjacent color resist blocks. The second alignment layer 23 covers the black matrix 24.

The present invention has beneficial effects described as follows. A molecular sieve is added to the material for preparing the support column 30, and the support column 30 is formed at a position corresponding to the via hole 50. When the alignment layer is formed on the conductive electrode, the PI solution flowing into the via hole 50 is incomplete, which results that the internal ions of the color resist layer 40 enter the liquid crystal layer 60. At this time, the function of adsorbing ions by the molecular sieve may effectively adsorb the ions precipitated in the color resist layer 40 inside the molecular sieve, thereby eliminating the influence of the ions on the liquid crystal in the liquid crystal layer 60. Therefore, the variation of the voltage of the liquid crystal at the via hole to cause uneven display brightness at the via hole 50 is avoided, so that twill weave is also improved.

In the above embodiments, the description of each embodiment has its own emphasis. For a part that is not described in detail in one embodiment, reference may be made to related descriptions in other embodiments.

In the above, the present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A liquid crystal display panel, comprising:
   a first substrate;
   a second substrate disposed opposite to the first substrate;
   a liquid crystal layer disposed between the first substrate and the second substrate;
   a color resist layer disposed between the first substrate and the second substrate;
   a conductive electrode disposed on the color resist layer; and
   an alignment layer disposed on the conductive electrode;
   wherein the conductive electrode is provided with a via hole penetrating through the conductive electrode and in contact with the color resist layer, and
   a support column is disposed on a side of the conductive electrode away from the color resist layer and corresponding to the via hole, and a material of the support column comprises a molecular sieve, and the molecular sieve comprises hydrated aluminosilicate.

2. The liquid crystal display panel according to claim 1, wherein the color resist layer is disposed between the first substrate and the conductive electrode, or the color resist layer is disposed between the second substrate and the conductive electrode.

3. The liquid crystal display panel according to claim 2, wherein a pixel electrode and a first alignment layer are sequentially disposed on the first substrate, and a common electrode and a second alignment layer are sequentially disposed on the second substrate.

4. The liquid crystal display panel according to claim 3, wherein the color resist layer is disposed between the first substrate and the pixel electrode, the conductive electrode comprises a pixel electrode disposed on the color resist layer, the alignment layer comprises the first alignment layer disposed on the pixel electrode, and the via hole penetrates through the pixel electrode.

5. The liquid crystal display panel according to claim 4, wherein the via hole penetrates through the color resist layer.

6. The liquid crystal display panel according to claim 3, wherein the color resist layer is disposed between the second substrate and the common electrode, the conductive electrode comprises the common electrode disposed on an array layer, the alignment layer comprises the second alignment layer disposed on the common electrode, and
the via hole penetrates through the common electrode.

7. The liquid crystal display panel according to claim 3, wherein the support column is disposed on the second alignment layer.

8. The liquid crystal display panel according to claim 7, wherein a plurality of the via holes are provided, and the support column comprises a plurality of columns corresponding to the plurality of via holes one by one.

9. The liquid crystal display panel according to claim 8, wherein the support column comprises a primary support column and a secondary support column, the primary column contacts with the first alignment layer and the second alignment layer, and the secondary support column is spaced from the second alignment layer.

10. The liquid crystal display panel according to claim 1, wherein a mass fraction of the molecular sieve in the support column ranges from 5% to 20%.

11. A liquid crystal display panel, comprising:
a first substrate;
a second substrate disposed opposite to the first substrate;
a liquid crystal layer disposed between the first substrate and the second substrate;
a color resist layer disposed between the first substrate and the second substrate;
a conductive electrode disposed on the color resist layer; and
an alignment layer disposed on the conductive electrode;
wherein the conductive electrode is provided with a via hole penetrating through the conductive electrode and in contact with the color resist layer, and
a support column is disposed on a side of the conductive electrode away from the color resist layer and corresponding to the via hole, and a material of the support column comprises a molecular sieve.

12. The liquid crystal display panel according to claim 11, wherein the color resist layer is disposed between the first substrate and the conductive electrode, or the color resist layer is disposed between the second substrate and the conductive electrode.

13. The liquid crystal display panel according to claim 12, wherein a pixel electrode and a first alignment layer are sequentially disposed on the first substrate, and a common electrode and a second alignment layer are sequentially disposed on the second substrate.

14. The liquid crystal display panel according to claim 13, wherein the color resist layer is disposed between the first substrate and the pixel electrode, the conductive electrode comprises a pixel electrode disposed on the color resist layer, the alignment layer comprises the first alignment layer disposed on the pixel electrode, and the via hole penetrates through the pixel electrode.

15. The liquid crystal display panel according to claim 14, wherein the via hole penetrates through the color resist layer.

16. The liquid crystal display panel according to claim 13, wherein the color resist layer is disposed between the second substrate and the common electrode, the conductive electrode comprises the common electrode disposed on an array layer, the alignment layer comprises the second alignment layer disposed on the common electrode, and the via hole penetrates through the common electrode.

17. The liquid crystal display panel according to claim 13, wherein the support column is disposed on the second alignment layer.

18. The liquid crystal display panel according to claim 17, wherein a plurality of the via holes are provided, and the support column comprises a plurality of columns corresponding to the plurality of via holes one by one.

19. The liquid crystal display panel according to claim 18, wherein the support column comprises a primary support column and a secondary support column, the primary support column contacts with the first alignment layer and the second alignment layer, and the secondary support column is spaced from the second alignment layer.

20. The liquid crystal display panel according to claim 11, wherein a mass fraction of the molecular sieve in the support column ranges from 5% to 20%.

* * * * *